Patented May 7, 1929.

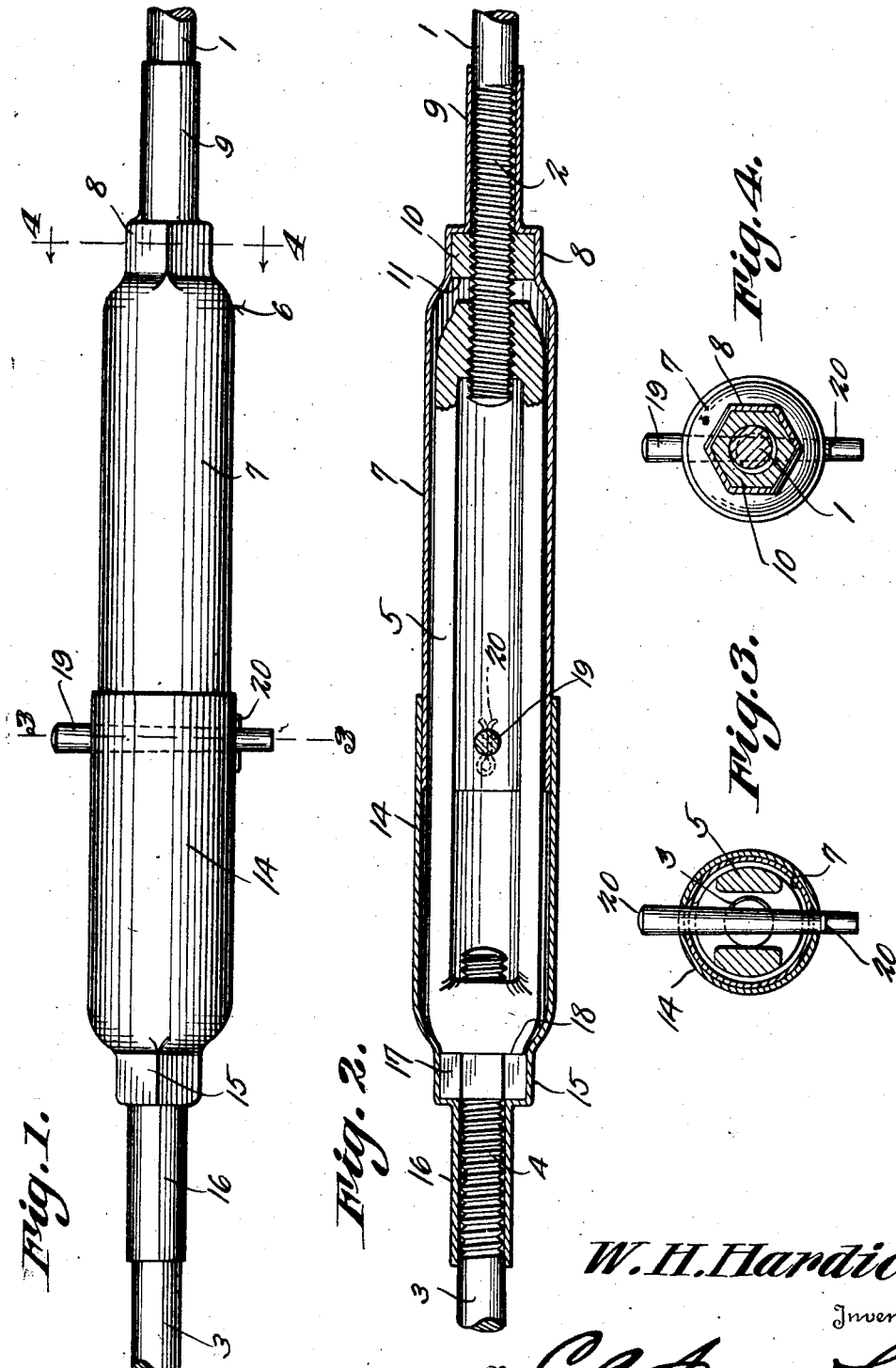

1,711,598

UNITED STATES PATENT OFFICE.

WILLIAM H. HARDICK, OF CADILLAC, MICHIGAN, ASSIGNOR OF ONE-HALF TO SOLON W. WEBB, OF CADILLAC, MICHIGAN.

TURNBUCKLE.

Application filed June 11, 1928. Serial No. 284,639.

This invention aims to provide novel means for housing a turnbuckle and for preventing rotation of the turnbuckle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in elevation, a device constructed in accordance with the invention;

Figure 2 is a longitudinal section wherein some parts are in elevation;

Figure 3 is a cross section on the line 3—3 of Figure 1;

Figure 4 is a cross section on the line 4—4 of Figure 1.

The numeral 1 marks a rod having threads 2, and the numeral 3 designates a rod having threads 4, the rods 1 and 3 being oppositely threaded as is common in turnbuckles. On the threaded ends of the rods is mounted a connector or loop 5. A telescopic casing 6, made of metal, is provided. The casing 6 includes a cylindrical member 7 having a reduced portion 8 which is of polygonal form so that a wrench can be applied to it. In the part 8 of the cylindrical member 7 is secured a nut 10 which may be considered as a part of the member 7. The inner end of the nut 10 constitutes a shoulder, which is marked by the numeral 11.

The threaded end 2 of the rod 1 cooperates with the nut 10, and the cylindrical member 7 of the casing includes a reduced neck 9 which covers and protects part of the threads 2 on the rod 1.

The casing 6 includes a cylindrical member 14 into which the cylindrical member 7 extends slidably. The cylindrical member 14 has a reduced portion 15 to which a wrench may be applied, the cylindrical portion 15 merging into a reduced neck 16 that covers part of the threads 4 on the rod 3. A nut 17 is secured in the reduced portion 15 of the casing member and may be considered as a part of the said casing member. The inner surface of the nut 17 forms a shoulder 18.

The numeral 19 designates a retainer, preferably a tapered pin, inserted removably through the overlapped ends of the casing members 7 and 14. The retainer 19 is held in place by a securing element 20 such as a cotter pin extended through the smaller end of the retainer. The retainer 19 extends between the side arms of the connector 5. The body portion of the turnbuckle is housed in and protected by the members 7 and 14 of the casing 6, the right hand end of the threads 2 is covered by the neck 9 and the left hand part of the threads 4 is covered by the neck 16.

Practically all parts of the turnbuckle, therefore, are housed in and protected against the weather. The inner end of the nut 17 abuts against one end of the connector 5 and the connector, thus, is held against turning. If the operator wishes, he can thread up the nut 10 against the end of the connector 5, the nut 17 being backed off from the position shown in Figure 2. The nuts, it will be recalled, are fixed in the respective members of the casing. The pin 19 prevents the members 7 and 14 of the casing from rotating relatively to each other. Because the pin 19 passes through the connector 5, the connector 5 cannot rotate much and loosen up, even if neither of the nuts 17 or 10 happens to be in abutment with the end of the connector 5. The nuts, however, when used as shown in connection with the nut 17 in Figure 2, hold the loop or connector 5 in any position to which it may have been rotated. The nuts afford an accurate but frictionally operating means for preventing the connector 5 from rotating, and the pin 19, although permitting a little rotation of the connector 5, affords a means whereby the connector is prevented from rotating through an arc greater than 30 degrees or so.

What is claimed is:—

In a device of the class described, two oppositely threaded pieces, a connector threaded on said pieces, and a telescopic casing comprising members which are threaded respectively on said pieces, one member of the casing having a shoulder engaging the connector to hold the connector against rotation, and a retainer engaging the members of the casing to prevent relative movement between them.

In testimony that I claim the foregoing as my own, I have hereto affixed my signature.

WILLIAM H. HARDICK.